US012762437B1

(12) United States Patent
Bihl et al.

(10) Patent No.: US 12,762,437 B1
(45) Date of Patent: Oct. 13, 2026

(54) METHOD AND SYSTEM FOR THE INPUT RECOGNITION THROUGH ANALOGICAL REASONING ALGORITHM

(71) Applicant: Government of the United States, as represented by the Secretary of the Air Force, Wright-Patterson AFB, OH (US)

(72) Inventors: Trevor Bihl, Franklin Furnace, OH (US); Kara Combs, Englewood, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 867 days.

(21) Appl. No.: 18/068,589

(22) Filed: Dec. 20, 2022

Related U.S. Application Data

(60) Provisional application No. 63/292,579, filed on Dec. 22, 2021, provisional application No. 63/292,576,
(Continued)

(51) Int. Cl.
*G06F 17/00* (2019.01)
*G06N 5/022* (2023.01)
*G06N 5/04* (2023.01)

(52) U.S. Cl.
CPC ............... *G06N 5/04* (2013.01); *G06N 5/022* (2013.01)

(58) Field of Classification Search
CPC ................................ G06N 5/04; G06N 5/022
See application file for complete search history.

(56) References Cited

U.S. PATENT DOCUMENTS 7,599,902 B2 * 10/2009 Fox .......................... G06N 5/04 706/54
2016/0224894 A1 * 8/2016 Soon-Shiong ........ G06F 16/951
(Continued)

OTHER PUBLICATIONS

Bart Theeten, Frederik Vandeputte, and Tom Van Cutsem. 2019. Import2vec learning embeddings for software libraries. In Proceedings of the 16th International Conference on Mining Software Repositories (MSR '19). IEEE Press, 18-28. <https://doi.org/10.1109/MSR.2019.00014> (Year: 2019).*
(Continued)

*Primary Examiner* — Greta L Robinson
(74) *Attorney, Agent, or Firm* — AFMCLO/JAZ; John T. Addicks

(57) ABSTRACT

A computer based artificial intelligence learning process using input recognition through analogical reasoning algorithm (IRTARA), the process including selecting at least one process setting. Providing at least one input to a data classification. Processing with at least one creation of class name and word vectors to provide input to an application of analogical reasoning & knowledge extraction. The application of analogical reasoning & knowledge extraction process supporting both improved data classification; and an evaluation process. The Input Recognition Through Analogical Reasoning Algorithm (IRTARA) approach described herein shows how Analogical Reasoning can be leveraged to improve input data recognition in out-of-library situations. IRTARA produces a word-based term frequency list that characterizes the out-of-library object of interest. To evaluate the quality of the results of IRTARA, both quantitative and qualitative assessments are used, including a baseline to compare the automated methods with human-generated results.

16 Claims, 2 Drawing Sheets

Related U.S. Application Data filed on Dec. 22, 2021, provisional application No. 63/476,043, filed on Dec. 19, 2022.

(56) References Cited

U.S. PATENT DOCUMENTS

| | | | | |
|---|---|---|---|---|
| 2020/0342323 | A1* | 10/2020 | Liu | G06N 3/082 |
| 2021/0312611 | A1* | 10/2021 | Neumann | G16H 50/30 |

OTHER PUBLICATIONS

Aylin Caliskan et al., Gender Bias in Word Embeddings: A Comprehensive Analysis of Frequency, Syntax, and Semantics. In Proceedings of the 2022 AAAI/ACM Conference on AI, Ethics, and Society.Association for Computing Machinery, 156-170. <https://doi.org/10.1145/3514094.3534162>, Jul. 2022.*

Zhou, L., et al, Leaming to Learn Image Classifiers with Visual Analogy, [received Nov. 29, 2025]. Retrieved from Intemet: <https://openaccess. thecvf.com/content_ CVPR_2019/html/Zhou_Leaming_ to _Learn_Image_ Classifiers_ With_ Visual_Analogy _ CVPR_2019 paper.html> (Year: 2019).

Ba, J., et al, Predicting Deep Zero-Shot Convolutional Neural Networks using Textural Descriptions, [received Nov. 29, 2025]. Retrieved from Internet: <https://www.cv-foundation.org/openaccess/content_iccv _2015/html/Ba_Predicting_Deep _Zero-Shot_ICCV 2015_ paper.html> (Year: 2015).

Drozd, A, et al., Word Embeddings, Analogies, and Machine Learning: Beyond King—Man+ Woman = Queen, [received Nov. 29, 2025]. Retrieved from Internet :<https://aclanthology.org/C16-1332/> (Year: 2016).

Rezende, D., et al, One-Shot Generalization in Deep Generative Models, [received Nov. 29, 2025]. Retrieved from Internet :<https://proceedings.mlr.press/v48/rezende16.html> (Year: 2016).

Yu, C., et al, Efficient Intelligent Automatic Image Annotation Method based on Machine Leaming Techniques, [received Nov. 29, 2025]. Retrieved from Intemet: <https://ieeexplore.ieee.org/abstracUdocumenU8991727> (Year: 2019).

Bounhas, M., et al, Analogical Classification: Handling Numerical Data, [received Nov. 29, 2025]. Retrieved from Internet: <https://link.springer.com/chapter/10.1007/978-3-319-11508-5_6> (Year: 2014).

Liu, W., et al, Few-Shot Text and Image Classification via Analogical Transfer Learning, [received Nov. 29, 2025]. Retrieved from Internet :<https://dl.acm.org/doi/abs/10.1145/3230709> (Year: 2018).

Marc Pickett, David Aha; Using cortically-inspired algorithms for analogical learning and reasoning, Biologically Inspired Cognitive Architectures (2013), http://dx.doi.org/10.1016/j.bica.2013.07.003.

Ichien, N., Liu, Q., Fu, S., Holyoak, K. J., Yuille, A. L., & Lu, H. (2021). Visual analogy: Deep learning versus compositional models. In T. Fitch, C. Lamm, H. Leder, & K. Teßmar-Raible (Eds.), Proceedings of the 43rd Annual Meeting of the Cognitive Science Society. Cognitive Science Society. Jul. 26, 2021.

Cheng, Yu et al, "Feedback-Driven Multiclass Active Learning for Data Streams"; CIKM '13: Proceedings of the 22nd ACM international conference on Information & Knowledge Managementpp. 1311-1320https://doi.org/10.1145/2505515.2505528; Published: Oct. 27, 2013.

* cited by examiner

METHOD AND SYSTEM FOR THE INPUT RECOGNITION THROUGH ANALOGICAL REASONING ALGORITHM

CROSS-REFERENCE TO RELATED APPLICATIONS

This application claims the benefit of priority under 35 U.S.C. § 119(e) to U.S. Provisional Application Ser. No. 63/292,576 entitled “Methods and System for Analogical Learning in Machine Learning Processes”, filed 22 Dec. 2021, and U.S. Provisional Application Ser. No. 63/292,579 entitled “Methods and System for Analogical Learning in Machine Learning Processes”, filed 22 Dec. 2021, U.S. Provisional Application Ser. No. 63/476,043 entitled “Methods and System for Analogical Learning in Machine Learning Processes”, filed 19 Dec. 2022 the contents of which are all incorporated herein by reference in their entirety.

RIGHTS OF THE GOVERNMENT

The invention described herein was made by employees of the United States Government and may be manufactured and used by or for the Government of the United States of America for governmental purposes without the payment of any royalties thereon or therefore.

BACKGROUND

The invention relates to an artificial intelligence (AI) algorithm and its use thereof. More specifically, it relates to the method and system for the image recognition through analogical reasoning algorithm in regards to the deployment of artificial intelligence (AI) across the industry, business, government, and military fields predominantly for computer vision.

SUMMARY OF THE INVENTION

A computer based artificial intelligence learning process using input recognition through analogical reasoning algorithm (IRTARA), the process including selecting at least one process setting. Providing at least one input to a data classification. Processing with at least one creation of class name and word vectors to provide input to an application of analogical reasoning & knowledge extraction. At least one process setting may include a classification algorithm library providing a classification algorithm, an analogical reasoning algorithm library providing a specific analogical reasoning algorithm, a dictionary library providing a dictionary; and an input data library providing input data. The data classification may include receiving known input data which is used to train the classification algorithm. The at least one creation of class name and word vectors includes an analytical reasoning algorithm to provide class names and word vector representations to the analogical reasoning & knowledge extraction process. The analogical reasoning & knowledge extraction process may include the creation of at least one unknown word vectors for input into the analog reasoning algorithm, resulting in new data which is provided to the classification algorithm and provides at least one Top-w closest words to the dictionary. The dictionary may then may provide top-t dictionary words to a creation of a term frequency list for comparison. The evaluation process may include comparing the term frequency list with dictionary; after the dictionary has received new data from the analogical reasoning algorithm. New data 41 may be provided to the analogical reasoning algorithm such that at least one new data label and secondary analogical reasoning in words is provided to comparison.

BRIEF DESCRIPTION OF THE DRAWINGS

The description of the illustrative embodiments can be read in conjunction with the accompanying FIGS. It will be appreciated that for simplicity and clarity of illustration, elements illustrated in the FIGS. have not necessarily been drawn to scale. For example, the dimensions of some of the elements are exaggerated relative to other elements. Embodiments incorporating teachings of the present disclosure are shown and described with respect to the FIGS. presented herein, in which.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

Figure 1A:
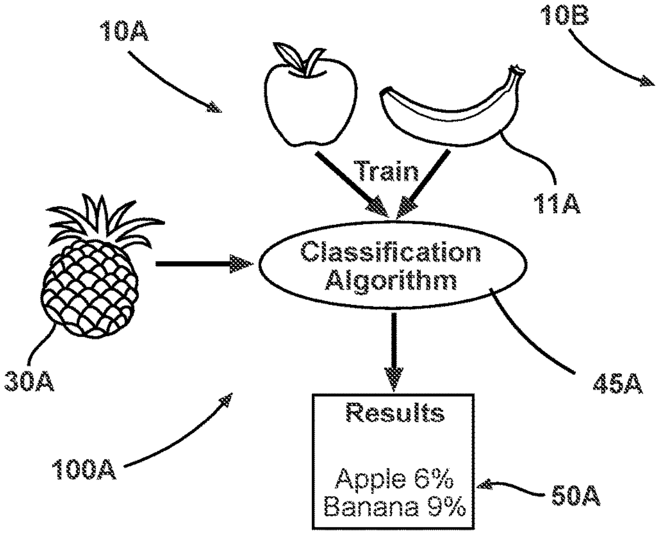
Fig. 1A (PRIOR ART)
FIG. 1A is an illustration of the prior art.
Figure 1B:
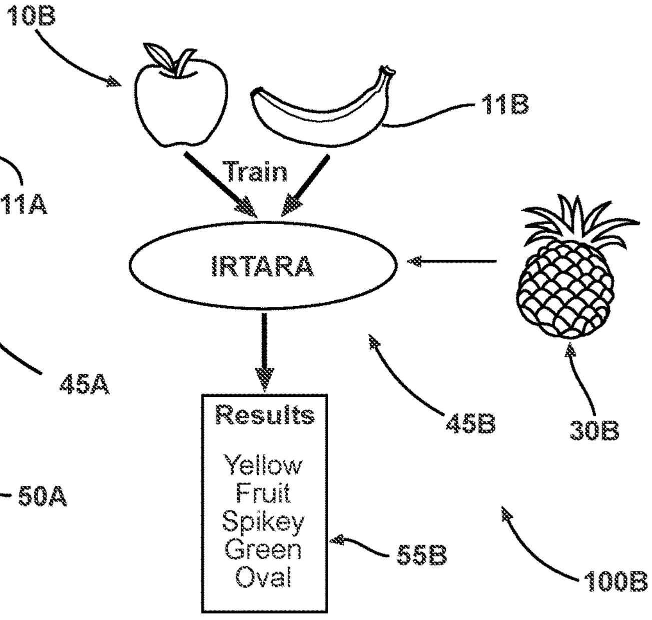
FIG. 1B is a simplified illustration of the present invention.

Most artificial intelligence (AI) algorithms, systems, and agents are limited to the data it was trained on, which becomes the AI's “library” or “memory”. The ability of AI to accurately predict, characterize, or describe objects and entities outside of its library has proven to be a difficult task. Presently, accurate and well-performing data classification methods are limited to data where the algorithm is aware of a ground truth which it compares results to derive typical metrics such as accuracy, misclassification rate, etc. However, these methods cannot perform well nor evaluate their results on “unknown” data, meaning the algorithm was not previously trained to recognize it and is unaware of any ground truth label associated with the “unknown” data. This makes typical evaluation metrics inapplicable. An example of this would be a classification algorithm that is trained to recognize pictures of apple and pears. A typical classification problem would pass through unseen images of apples and bananas with the hope of the algorithm accurately classifying them into their respective categories is shown in FIG. 1A and FIG. 1B. However, what happens when an out-of-library object, such as a pineapple, is passed through the algorithm? The algorithm can only classify it as an apple or a pear, which is not accurate at all. IRTARA remedies this issue, by utilizing analogical reasoning and text mining to describe the out-of-library objects rather than simply classify them into the groups known to the classification algorithms. To verify the quality of IRTARA's results, that these descriptions are of high quality, two evaluation methods are proposed since the typical accuracy and misclassification rate no longer applies. Therefore, enhancements that allow current AI algorithms and models to do this are of great value.

By way of example FIG. 1A shows the prior art Artificial Intelligence classification process 100A where apple data 10A and banana data 11A are used to train a fruit classification algorithm 45A, when the classification algorithm 45A is then asked to describe a pineapple 30A, the illustrated results 50A are low probabilities of the known universe of the classification algorithm 45A.

FIG. 1B illustrates a similar process using IRTARA 45B where apple data 10B and banana data 11B are used to train a IRTARA 45B. When the a IRTARA 45B asked to describe a pineapple 30A, the illustrated results 55B include the data gathered such as yellow, fruit, spikey, green, oval. IRTARA learns from the question of how to classify a given input object, as well as the training data.

One method for identifying out-of-library (OOL) entities is analogical reasoning, which is learning by analogy. Analogical reasoning has a deep history of applications in verbal/textual problems as well as visual ones. In this technique, an agent (human or artificial), compares a familiar "base" scenario to an unfamiliar "target" and draws parallels between the two to abstract information about the target that is not necessarily obvious without the comparison to the base. The benefit of analogical reasoning is the way new information about OOL entities can be "learned" by the algorithm without the need for specific training data on the OOL entity.

To leverage the benefits of analogical reasoning to address the current shortcomings of AI, the method and system for the input recognition through analogical reasoning algorithm (IRTARA) gives autonomous computer applications the ability to identify, describe, and learn about those previously difficult out-of-library (OOL) entities. IRTARA is a customizable and modular approach that utilizes text mining to semantically describe/characterize OOL entities using only the input data and their labels as input data. It is considered modular due to its ability to accommodate and incorporate any classification algorithm (for input data classification), analogical reasoning algorithm, and dictionary (for deriving meaning) within its workflow.

Figure 2:
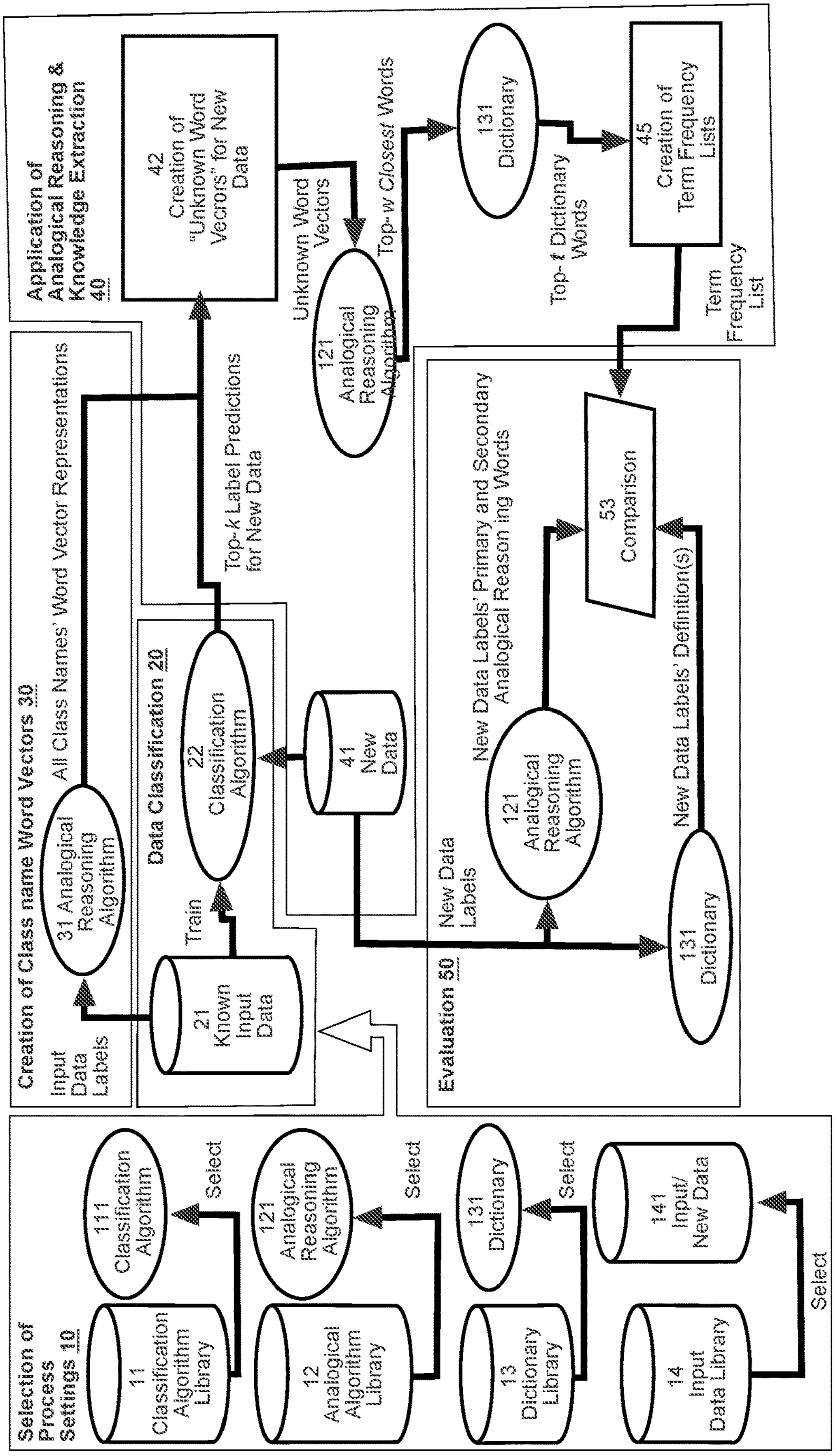
FIG. 2 is an illustration of the input recognition through analogical reasoning algorithm (IRTARA) process.

As illustrated in FIG. 2, which utilizes cylinders to represent data libraries, ovals to represent modules (pre-trained models for the designated purpose), rectangles for key steps within a sub-process, and rhomboid (non-rectangular parallelogram) for evaluation methods. Definitions of the modules and elements of each sub-process are as illustrated in FIG. 2.

FIG. 2 illustrates one embodiment of the IRTARA process 100 divided broadly into selection of the process settings 10, providing input to a data classification 20 processing with development of class name and word vectors 30 to provide input to an application of analogical reasoning & knowledge extraction 40.

The application of analogical reasoning & knowledge extraction process 40 supports both improved data classification 20 and evaluation process 50.

The selection of the process settings 10 may include a classification algorithm library 11 which includes a collection of algorithms such artificial neural networks, decision trees, and the like. that can classify data into multiple groups from which the classification algorithm used throughout IRTARA is selected from.

A specific classification algorithm 111 may be selected for use in IRTARA, this is the same classification algorithm 111 used and illustrated in data classification 20.

An analogical reasoning algorithm library 12 may include a collection of pre-trained algorithms that can represent words as vectors such as vector space models from which the analogical reasoning algorithm used throughout IRTARA is selected from. A specific analogical reasoning algorithm 121 may be selected for use in IRTARA, this is the same as in the later modules shown in development/creation of class name and word vectors 30, analogical reasoning & knowledge extraction process 40 and evaluation process 50.

The selection of the process settings 10 may further include a dictionary library 13 that includes a collection of (digital) dictionaries including WordNet, Merriam Webster Online, and the like, from which a dictionary 131 is selected and used. The dictionary 131 may also be used as illustrated in the analogical reasoning & knowledge extraction 40 process and the evaluation process 50 as illustrated.

The selection of the process settings 10 may further include an input data library 14. The input data library 14 may include a collection of data sets such as CIFAR-10, CIFAR-100, and the like from which input data 141 is selected.

The input data 141 may be used throughout IRTARA. As illustrated the input data may be split into a known input data 21 which is what the classification algorithm 111 is trained to recognize and a new data 41 (it can be a class of input data set aside or completely external from the training input data), which is part of the analogical reasoning & knowledge extraction process 40 and a single class of data to be described and characterized by IRTARA.

Known input data 21 may be obtained from the input data 141 that the classification algorithm 111 is trained to recognize.

Classification algorithm 22 may use the known input data 21 to creates a classification algorithm 111, trained on the classes therein.

Analogical reasoning algorithm 31 Using the known input data labels, AKA the class names, the analogical reasoning algorithm identifies their vector representation. See the definition for 1.2.1.

New data 41 may be a single class from the input data 141 that the classification algorithm 111 is not pre-trained on.

The data classification process 20 may include using known input data 21 for the creation of class name and word vectors 30 by providing input to the analogical reasoning algorithm 121 and providing known input data to train the classification algorithm 111. Both the creation of class name and word vectors 30 process provide input to the analogical reasoning & knowledge extraction process 40.

The data classification 20 process providing Top-k label predictions for new data to the creation of unknown word vectors for new data 42, while the creation of class name and word vectors 30 process provides class names-word vector representations to the creation of unknown word vectors for new data 42.

The class name word vectors 30 are together used to create a representative word vector corresponding to each data instance within the new data class (e.g., if there are 10 instances within the new data, such as 10 images, there will be a unknown word vector generated for each of them).

As further illustrated in FIG. 2 the analogical reasoning & knowledge extraction process 40 may include the creation of at least one unknown word vectors 42 for input into the analog reasoning algorithm 121 for creating new data 41 which may support the classification algorithm 111 or a plurality of new data labels for the evaluation process 50 analog reasoning algorithm 121 and the evaluation dictionary 511. The evaluation usage of the analogical reasoning algorithm 121 may be used to provide new data labels and secondary analogical reasoning words to a comparison process 53. Similarly, the dictionary process 511 may provide new data label definitions to the comparison process 53.

As illustrated in FIG. 2 the analogical reasoning & knowledge extraction process 40 includes a process for creation of unknown word vectors for new data 42 which provides those unknown word vectors to the analogical reasoning algorithm 121. The analogical reasoning to a dictionary 44. The dictionary 44 then providing top-t dictionary words to a creation of a term frequency list 45. The term frequency list 45 then being provided to comparison 53 for input recognition through analogical reasoning algorithm (IRTARA) machine learning.

Given the "unknown word vectors" developed in a process for creation of unknown word vectors for new data 42, the analogical reasoning algorithm 121 identifies the top-w word(s) that each unknown word vector has the highest cosine similarity with and therefore, is "closest to." This is repeated for each data instances such that if there were 10 instances and the user wanted the top-5 words (w=5), there would be 5 words associated with the first instance, 5 for the second, and so on.

The dictionary 44 takes the top-w word(s) identified by the analogical reasoning algorithm and retrieves each word's definition(s). The definition(s) have all semantically-neural words removed (e.g., "a," "I," "the," etc.). This is repeated for each data instance's top-w words. See the definition for 1.3.1.

The top-t dictionary words are provided to the term frequency list 45 by the analogical reasoning algorithm 121 which are the words that occur the most across the results generated from all the data instances.

The dictionary 511 takes the new data's label, AKA class name, and identifies its definition(s) to be used in evaluation. See the definition for 1.3.1.

The Analogical reasoning algorithm 121 used in evaluation process 50 takes the new data's label, AKA class name, and identifies its primary and secondary analogical reasoning words.

During comparison 53, the words in the new data's dictionary 511 and analogical reasoning algorithm 121 are in one embodiment both compared separately to the words/terms in the term frequency list 45. Prior to using the IRTARA process for analogical reasoning (AR) based understanding of data, instantiating IRTARA and selecting the underlying methods to be used is needed. Given a variety of libraries during the selection of process settings that are applicable to be use, the user may select at least one of each to be utilized by the IRTARA process.

As illustrated in FIG. 2 the classification algorithm 111 and known input data 141 may be used for data classification 20. Data classification 20 is the first process whereby known data is used to develop a classifier model for prediction of classes. The known input data 21 is used to train the classification algorithm 111 for classification. For instance, image data might be used to train an artificial neural network (ANN) of choice to identify whether the image is of a cat or dog.

The creation of class name word vector 30 may occur simultaneously with the data classification process 20 or thereafter. The labels of the known input data (to the classification algorithm) are sent to the analogical reasoning algorithm (3.1. in FIG. 2) so that their word-vector forms can be extracted (this information is already known by the analogical reasoning model due to pre-training external to IRTARA). This creates the data's class name word vector representation forms, which are used with the classification algorithm results in the fourth process.

As illustrated in FIG. 2, After known input data 21 training, the classification algorithm 111 is used to classify an out-of-library (OOL) class (new data 41), that the classification algorithm 111 has never been trained on nor in general, aware of its existence. The classification algorithm 111 classifies the new data of the unknown class into the classes it is aware of, which is used in the Creation of Unknown Word Vectors for New Data 42, the application of analogical reasoning & knowledge extraction 40.

The word vector representation of those known classes identified in the creation of class name word vectors 20 is retrieved respectively as the classification algorithm 1111 classifies the new data 41 as one of the classes of the known input data 21. The word vector representation of the class labels multiplied by the classification algorithm's predicted probability of being in said class is summed for the top-k classes for each instance with the new data (where k can be adjusted by the user). This is the creation of the unknown word vectors 42, of which one exists for each new data instance. These unknown word vectors are passed through the analogical reasoning algorithm 121 and later used to identify the top-w closest words within the analogical reasoning algorithm's pre-trained vocabulary (where w can also be adjusted by the user). These words are passed to the dictionary 44 to retrieve their respective definitions. These definitions are edited so that words within the stop list are removed; the stop list can include pre-made lists in addition to other words that the user can explicitly exclude. The remaining words from the definitions, dubbed the "dictionary words," are counted and the top-t occurring dictionary words become a term frequency list 45 (where t can be adjusted by the user). The term frequency list 45 is passed into the final process evaluation.

The words in the term frequency list 45 can be compared through two automated methods specific to IRTARA. These are the definition evaluation and the analogical reasoning evaluation. Both require the new data 41 to be passed to both the dictionary 511 and analogical reasoning algorithm 121.

The definition evaluation (new data labels definition(s)) from the dictionary 511 and the new data labels primary and secondary analogical reasoning words from the analogical reasoning algorithm 121 provide the comparison 53 with the needed input to identify how many words within the unknown class label's definition makes an appearance in the term frequency list 45. The analogical reasoning evaluation looks at the unknown class label's top-u primary words (u can be adjusted) and up to the top-uv (v can be adjusted) secondary words. Primary words are those words closest to the unknown class label identified by their cosine similarity within the analogical reasoning algorithm. Secondary words are the top-v words close to each of the primary words identified. Duplicate primary/secondary words are removed without replacement. Similar to the definition evaluation, the term frequency list is evaluated to see if any words within are also primary or secondary words in the analogical reasoning evaluation method. From this performance metrics can be compiled and evaluated in comparison 53.

While the present invention has been illustrated by a description of one or more embodiments thereof and while these embodiments have been described in considerable detail, they are not intended to restrict or in any way limit the scope of the appended claims to such detail. Additional advantages and modifications may readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A computer based artificial intelligence learning process using input recognition through analogical reasoning algorithm (IRTARA), the process including:

selecting at least one process setting including at least one of:

a classification algorithm library providing a classification algorithm:

an analogical reasoning algorithm library providing a specific analogical reasoning algorithm;

a dictionary library providing a dictionary; and an input data library providing input data;

providing at least one input to a data classification;

processing with at least one creation of class name and word vectors to provide input to an application of analogical reasoning & knowledge extraction;

the application of analogical reasoning & knowledge extraction processes supporting both improved data classification;

and an evaluation process including comparing the term frequency list with the dictionary, after the dictionary has received new data from the analogical reasoning algorithm.

2. The process of claim 1, wherein the data classification includes receiving known input data which is used to train the classification algorithm.

3. The process of claim 2, wherein the at least one creation of class name and word vectors includes an analytical reasoning algorithm to provide class names and word vector representations to the analogical reasoning & knowledge extraction process.

4. A computer-based artificial intelligence learning process using input recognition through an analogical reasoning algorithm (IRTARA) comprising:

generating, via a classification algorithm, a set of top-k label predictions for a new data input;

generating, via an analogical reasoning algorithm, word vector representations for a plurality of known class names;

creating an unknown word vector for the new data input based on the set of top-k label predictions and the word vector representations;

applying the unknown word vector to the analogical reasoning algorithm to identify a set of top-w closest words from a dictionary; and processing a dictionary definition for each word of the set of top-w closest words to generate one or more term frequency lists that provide a semantic characterization of the new data input.

5. The process of claim 4, further comprising performing an evaluation process by comparing the one or more term frequency lists to a dictionary-derived definition of the new data input.

6. The process of claim 4, further comprising performing an evaluation process by comparing the one or more term frequency lists to a dictionary-derived definition of an actual class name for the new data input.

7. The process of claim 4, wherein the known class names are associated with a known library of training images, and wherein the library of training images is constructed from a subset of classes from a pre-existing library of data comprising a plurality of images.

8. The process of claim 7, wherein the pre-existing library of data is selected from the group consisting of CIFAR-10 and CIFAR-100.

9. The process of claim 4, wherein creating the unknown word vector comprises:

(a) for each of the top-k label predictions, calculating a weighted vector by multiplying the word vector representation of the corresponding known class name by a predicted probability associated with that label prediction; and (b) summing the weighted vectors to generate the unknown word vector.

10. The process of claim 9, wherein a value for k is adjustable by a user.

11. A computer-based artificial intelligence learning process using input recognition through an analogical reasoning algorithm (IRTARA) comprising:

selecting at least one process setting from a selection of process settings comprising a classification algorithm library providing a classification algorithm, an analogical reasoning algorithm library providing a specific analogical reasoning algorithm, a dictionary library providing a dictionary, and an input data library, comprising a known input data and a new data;

based on an input of the known input data and the new data to the classification algorithm, generating top-k label predictions for the new data, based on an input of the known input data and input data labels to the analogical reasoning algorithm, generating all class names' word vector representations, based on an input of the top-k label predictions for the new data and the all class names' word vector representations, creating unknown word vectors for the new data and applying the unknown word vectors to the analogical reasoning algorithm to generate a top-w closest words;

providing the top-w closest words to the dictionary to generate a top-t dictionary words and one or more term frequency lists;

based on the term frequency lists performing an evaluation process comprising comparing the term-frequency list to dictionary-derived definitions and analogical reasoning words for the new data produced by the analogical reasoning algorithm and the dictionary.

12. The process of claim 11, wherein creating unknown word vectors comprises:

(a) for each of the top-k label predictions, calculating a weighted vector by multiplying the word vector representation of the corresponding known class name by a predicted probability associated with that label prediction; and (b) summing the weighted vectors to generate the unknown word vector.

13. The process of claim 11, wherein a value for k is adjustable by a user.

14. The process of claim 11, wherein the known input data comprises a library of training images constructed from a subset of classes from a pre-existing image dataset.

15. The process of claim 14, wherein the pre-existing image dataset is selected from the group consisting of CIFAR-10 and CIFAR-100.

16. The process of claim 11, wherein performing the evaluation process comprises comparing the one or more term frequency lists to a dictionary-derived definition of an actual class name for the new data.

* * * * *